United States Patent
Takata et al.

(10) Patent No.: US 8,173,320 B2
(45) Date of Patent: May 8, 2012

(54) FUEL CELL STACK AND METHOD FOR MAKING THE SAME

(75) Inventors: Koshi Takata, Yokosuka (JP); Takahito Osada, Yokohama (JP); Atsushi Miyazawa, Kamakura (JP); Motoharu Obika, Yokohama (JP); Motoki Yaginuma, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 751 days.

(21) Appl. No.: 12/294,079

(22) PCT Filed: May 15, 2007

(86) PCT No.: PCT/IB2007/001256
§ 371 (c)(1),
(2), (4) Date: Sep. 23, 2008

(87) PCT Pub. No.: WO2007/135508
PCT Pub. Date: Nov. 29, 2007

(65) Prior Publication Data
US 2009/0053571 A1 Feb. 26, 2009

(30) Foreign Application Priority Data
May 16, 2006 (JP) ................................. 2006-136952

(51) Int. Cl.
H01M 8/24 (2006.01)

(52) U.S. Cl. ........................................ 429/457; 429/510

(58) Field of Classification Search .................... 429/26, 429/457, 510, 517, 519
See application file for complete search history.

(56) References Cited

U.S. PATENT DOCUMENTS

| | | | |
|---|---|---|---|
| 5,252,410 A * | 10/1993 | Wilkinson et al. | 429/438 |
| 2005/0158603 A1 | 7/2005 | Murphy et al. | |
| 2005/0282048 A1 * | 12/2005 | Kamo et al. | 429/12 |
| 2007/0148503 A1 * | 6/2007 | Okazaki | 429/13 |
| 2007/0207365 A1 * | 9/2007 | Ohnuma | 429/38 |
| 2007/0231666 A1 * | 10/2007 | Wang et al. | 429/38 |
| 2008/0026281 A1 * | 1/2008 | Hayashi et al. | 429/36 |
| 2010/0068600 A1 * | 3/2010 | Sato et al. | 429/34 |

FOREIGN PATENT DOCUMENTS

| | | |
|---|---|---|
| JP | 2003-263994 | 9/2003 |
| JP | 2004-111200 | 4/2004 |
| JP | 2005-002411 | 1/2005 |
| JP | 2005-190968 | 7/2005 |
| JP | 2005-276807 | 10/2005 |
| JP | 2005-317479 | 11/2005 |
| WO | WO 2006/043729 | 4/2006 |

* cited by examiner

Primary Examiner — Hien Vu
(74) Attorney, Agent, or Firm — Drinker Biddle & Reath LLP

(57) ABSTRACT

A fuel cell stack includes a membrane electrode assembly including an electrolyte membrane and electrode catalyst layers sandwiching the electrolyte membrane; metal separators that define gas channels, the metal separators being respectively disposed at both surfaces of the membrane electrode assembly; a current collector from which electromotive force is derived, the current collector being in contact with at least one of the metal separators; and joining parts that join the metal separator to the current collector at portions where the metal separator contacts the current collector.

13 Claims, 14 Drawing Sheets

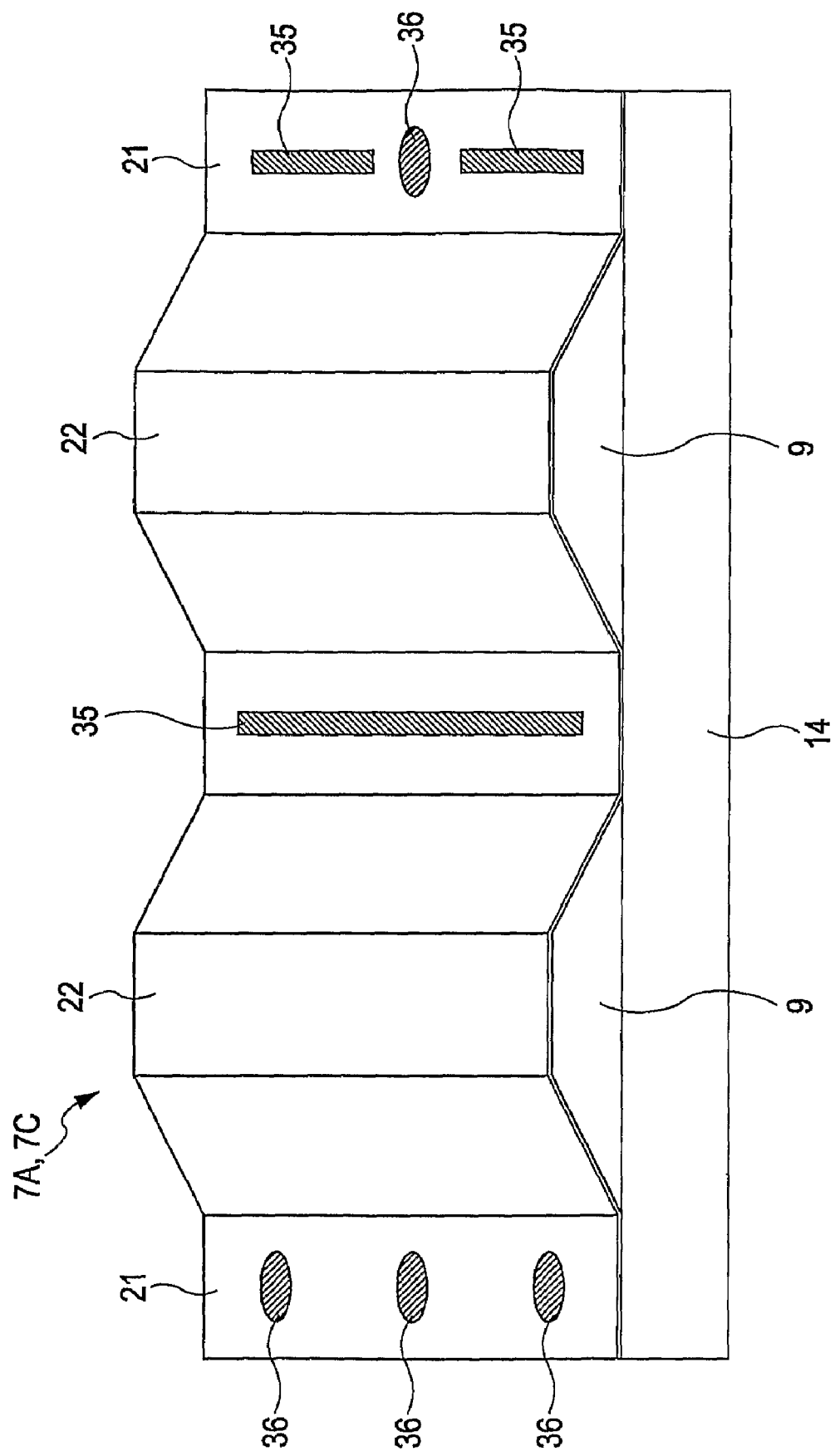

FUEL CELL STACK AND METHOD FOR MAKING THE SAME

CROSS-REFERENCE TO RELATED APPLICATIONS

This application claims priority to Japanese Patent Application No. 2006-136952, filed May 16, 2006, the disclosure of which is incorporated by reference herein in its entirety.

BACKGROUND OF THE INVENTION

1. Field of the Invention

The present invention relates to fuel cell stacks and methods for making the fuel cell stacks. In particular, the present invention relates to a fuel cell stack having a separator made from a metal plate and a method for making such a fuel cell stack.

2. Description of the Related Art

A polymer electrolyte membrane (PEM) fuel cell includes a solid polymer electrolyte membrane having proton conductivity, and a pair of electrodes (anode and cathode) sandwiching the electrolyte membrane. Fuel gas is supplied to the anode while oxidizing gas is supplied to the cathode so that electric power is generated as a result of an electrochemical reaction that occurs on the surfaces of the electrolyte membrane.

One fuel cell includes a membrane electrode assembly (MEA) having a pair of electrode catalyst layers and an electrolyte membrane interposed between the electrode catalyst layers, and two separators respectively disposed at two sides of the MEA to define gas channels.

Each separator that defines a gas channel for the fuel gas or oxidizing gas also defines a temperature-controlling medium channel through which a temperature-controlling medium flows.

Since the separator also functions as a conduction path for retrieving output from the electrode catalyst layer of each fuel cell, the separator is entirely composed of an electrically conductive material.

A fuel cell stack includes as many fuel cells as needed to derive a required output voltage, the fuel cells being stacked in series, and a pair of current collectors respectively disposed at the two ends of the stack in the stacking direction. Electric power output from each fuel cell is derived from the current collectors.

According to related art, separators for fuel cells have been made of carbon, which has both corrosion resistance and electrical conductivity. In recent years, metal separators are used to reduce the cost of fuel cells and decrease the thickness of the separator while increasing the output density.

Examples of existing metal separators include a stainless steel plate with titanium or a titanium alloy clad thereon serving as a corrosion-resistant coating, a stainless steel plate having thereon a noble metal plating layer serving as a corrosion-resistant coating, a stainless steel plate having thereon a titanium coating layer serving as a corrosion-resistant coating, and a metal plate having thereon a noble metal plating layer serving as a corrosion-resistant coating. Japanese Unexamined Patent Application Publication Nos. 2005-002411, 2005-190968, 2005-276807, and 2005-317479 disclose such separators.

SUMMARY OF THE INVENTION

However, existing fuel cell stacks have metal separators and current collectors that partly contact each other; thus, the electrical conductivity therebetween may be decreased or the power-generating performance may be degraded.

The present invention overcomes problems of the existing art. An object of the present invention is to provide a fuel cell stack having high power-generating performance and a method for making such a fuel cell stack.

In an embodiment, the invention provides a fuel cell stack including a membrane electrode assembly that includes an electrolyte membrane and electrode catalyst layers sandwiching the electrolyte membrane; metal separators that define gas channels, the metal separators being respectively disposed at both surfaces of the membrane electrode assembly; a current collector from which electromotive force is derived, the current collector being in contact with at least one of the metal separators; and joining parts that join the metal separator to the current collector at portions where the metal separator contacts the current collector.

In another embodiment, the invention provides a method for making a fuel cell stack including a membrane electrode assembly that includes an electrolyte membrane and electrode catalyst layers sandwiching the electrolyte membrane, and metal separators that define gas channels, the metal separators being respectively disposed at both surfaces of the membrane electrode assembly. The method includes contacting a current collector from which electromotive force is derived with at least one of the metal separators, and joining the metal separator and the current collector at a portion where the metal separator contacts the current collector.

According to the present invention, the penetration electrical resistance between a separator and a current collector can be reduced as a result of providing joining parts that join the separator to the current collector. Thus, the power-generating performance of the fuel cell stack can be enhanced.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 7 is an oblique perspective view of the current collector and the first or second separator;

DETAILED DESCRIPTION OF THE PREFERRED EMBODIMENTS

Embodiments of a fuel cell stack and a method for making the fuel cell stack of the present invention will now be described with reference to the attached drawings.

Figure 1:
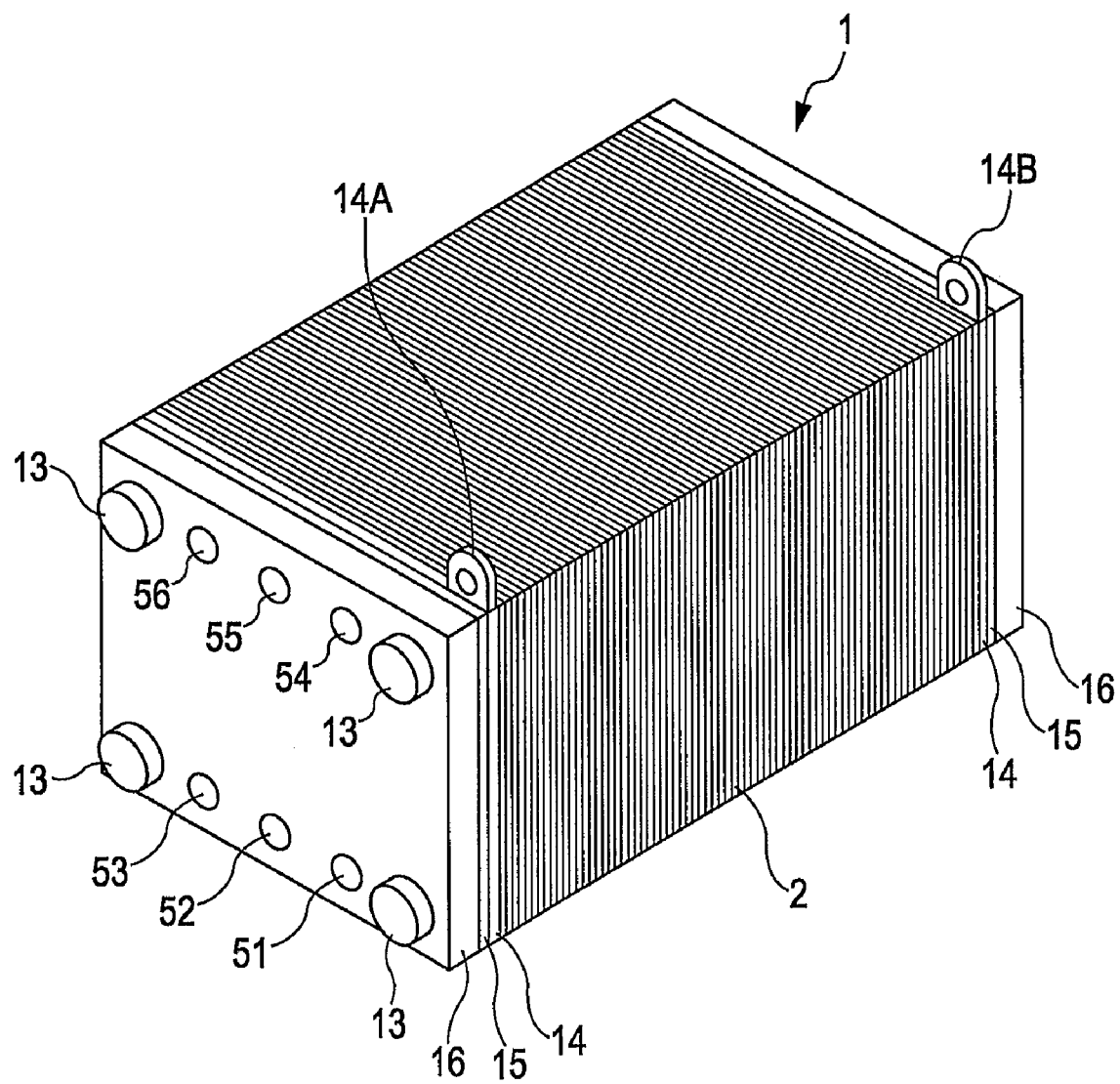
FIG. 1 is an oblique perspective view of a fuel cell stack of an embodiment of the present invention.
Figure 2:
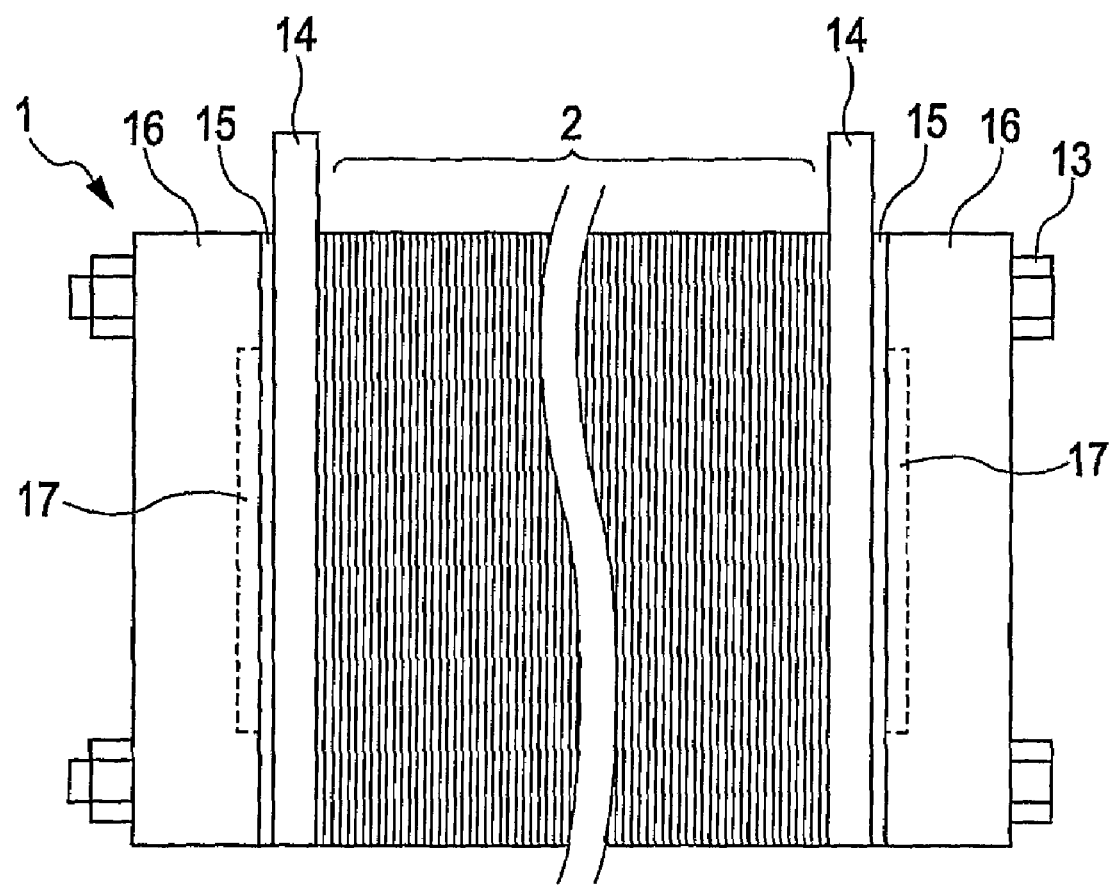
FIG. 2 is a side-view of the fuel cell stack.

FIG. 1 is a perspective view of a fuel cell stack according to an embodiment of the present invention. FIG. 2 is a side view of the fuel cell stack. As shown in FIGS. 1 and 2, a fuel cell stack 1 includes a plurality of fuel cells 2 stacked in series; a pair of current collectors 14, a pair of insulating plates 15, and a pair of end plates 16 respectively disposed at the two ends of the stack in the stacking direction; and a plurality of tie rods 13. The tie rods 13 draw together the end plates 16 to thereby apply a clamping load in the stacking direction of the fuel cells 2.

In a general fuel cell system for automobiles, a fuel cell stack 1 includes 300 to 400 fuel cells 2 stacked in series.

Referring to FIG. 1, one of the end plates 16 has openings which are a cathode gas inlet 51, a temperature-controlling medium inlet 52, an anode gas inlet 53, a cathode gas outlet 54, a temperature-controlling medium outlet 55, and an anode outlet 56. Pipes are connected to these openings, although the pipes are not shown in the drawing.

Each current collector 14 is composed of, for example, a gas-impermeable metal material such as a copper plate, and electromotive force generated by the fuel cell stack 1 is output through output terminals 14A and 14B.

Figure 3:
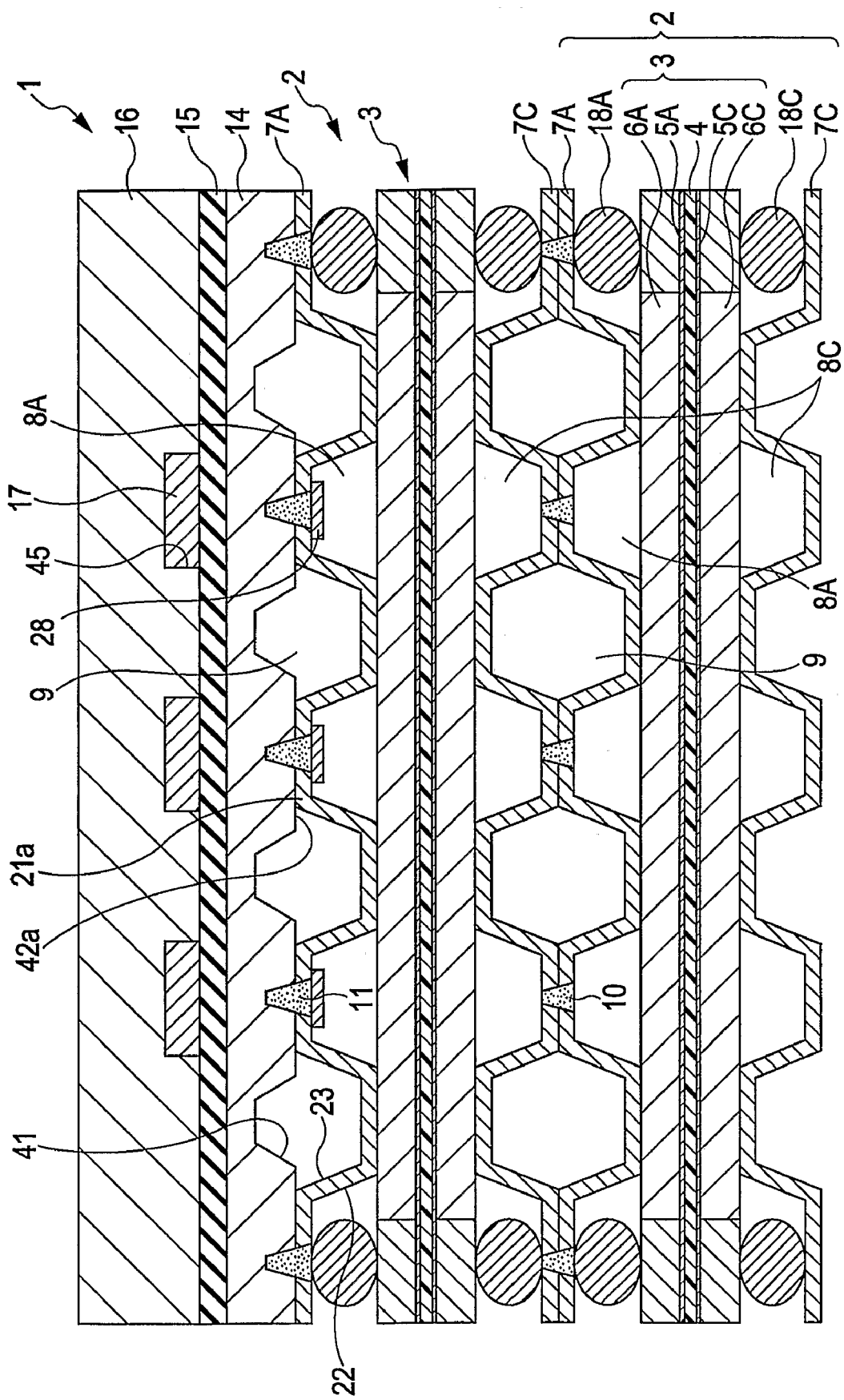
FIG. 3 is a cross-sectional view of the fuel cell stack.

Referring now to FIG. 3, a first separator (end separator) 7A of the fuel cell 2 at one end of the fuel cell stack 1 and a second separator (end separator) 7C of the fuel cell 2 at the other end of the fuel cell stack 1 respectively contact the current collectors 14 so that the electromotive force of the fuel cell stack 1 is fed to each of the current collectors 14.

The insulating plate 15 is interposed between the end plate 16 and the current collector 14 to insulate the current collector 14 from the end plate 16. When the end plate 16 is composed of an insulating material, it is possible to omit the insulating plate 15. Moreover, it is possible to form each end plate with a conductive material such that the end plate also functions as a current collector.

The fuel cell stack 1 has a pair of electric heaters 17 for heating the current collectors 14. The electric heaters 17 are respectively disposed at the two ends of the fuel cell stack 1 and are connected to a controller (not shown) via lead wires. The controller turns the electric heaters 17 on at the time of cold start of the fuel cells or the like so that the end separators (first and second separators 7A and 7C) are rapidly heated and the power-generating performance of the fuel cell stack 1 is thereby rapidly enhanced.

As shown in FIG. 3, a fuel cell 2 constitutes one unit. The fuel cell 2 includes a membrane electrode assembly (MEA) 3 constituted from an electrode catalyst layer 5A, an electrode catalyst layer 5C, and an electrolyte membrane 4 interposed between the electrode catalyst layers 5A and 5C; and a first separator 7A disposed at one side of the membrane electrode assembly 3 to define a gas channel 8A and a second separator 7C disposed at the other side of the membrane electrode assembly 3 to define a gas channel 8C.

The electrolyte membrane 4 of the membrane electrode assembly 3 is a proton-conducting solid polymer electrolyte membrane. The electrode catalyst layers 5A and 5C for the anode and cathode are respectively disposed in the reaction regions on the both sides of the electrolyte membrane 4. Gas diffusing layers 6A and 6C for the anode and cathode are disposed to sandwich the electrolyte membrane 4 and the electrode catalyst layers 5A and 5C. The electrode catalyst layers 5A and 5C are composed of, for example, platinum alone or in combination with another metal. The gas diffusing layers 6A and 6C are composed of a material having gas-diffusing ability and electrical conductivity, such as carbon cloth, carbon paper, and carbon felt.

In a fuel cell, fuel gas is fed to the anode and oxidizing gas is fed to the cathode which opposes the anode with the electrolyte membrane 4 therebetween. The reactions represented by formulae (1) and (2) below occur in the surfaces of the electrolyte membrane 4 to thereby generate electric power:

$$\text{Anodic reaction: } H_2 \rightarrow 2H^+ + 2e^- \quad (1)$$

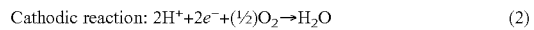

$$\text{Cathodic reaction: } 2H^+ + 2e^- + (\tfrac{1}{2})O_2 \rightarrow H_2O \quad (2)$$

Gaskets are disposed in a peripheral region surrounding the reaction regions of the electrolyte membrane 4. The gaskets are provided on the both sides of the membrane electrode assembly 3. That is, the first separator 7A and the second separator 7C sandwich the membrane electrode assembly 3 through gaskets 18A and 18C.

A gas channel 8A for feeding anode gas is formed between the first separator 7A and the gas diffusing layer 6A. For example, hydrogen gas serving as anode gas is introduced into the gas channel 8A through an inlet manifold (not shown) and fed to the gas diffusing layer 6A through the gas channel 8A. The gas not used in the reaction is discharged from the outlet manifold.

A gas channel 8C for introducing cathode gas is formed between the second separator 7C and the gas diffusing layer 6C. For example, air serving as the cathode gas is introduced into the gas channel 8C through the inlet manifold and fed to the gas diffusing layer 6C through the gas channel 8C. The gas not used in the reaction is discharged from the outlet manifold.

A temperature-controlling medium channel 9 for distributing a temperature-controlling medium is formed between the first separator 7A and the second separator 7C. For example, cooling water serving as a temperature-controlling medium is introduced from an inlet manifold into the temperature-controlling medium channel 9, is passed through the gap between the first separator 7A and the second separator 7C, and is discharged from an outlet manifold. The temperature-controlling medium absorbs the heat of reaction through the first separator 7A and the second separator 7C to cool the fuel cell stack 1.

Gaskets (not shown) are also interposed between the first separator 7A and the second separator 7C to prevent leakage of the temperature-controlling medium.

The temperature-controlling medium preferably has high electrical resistance. An antifreezing fluid that does not freeze in cold environments is used as the temperature-controlling medium for a fuel cell mounted in an automobile.

The first separator 7A and the second separator 7C are made from metal plates and are composed of, for example, SUS316L stainless steel, while considering the operation conditions and the inner environment of the fuel cell.

The base material for the first separator 7A and the second separator 7C is not limited as such and may be a stainless steel containing at least one of Fe, Ni, and Cr as the main component, a single metal such as Al, Ti, Cu, Zn, Mg, Mn, Pb, Au, Ag, Pt, Pd, Ru, W, Ni, Cr, Sn, or Fe, or an alloy containing one of these elements as the main component.

The first separator 7A and the second separator 7C are produced by press-molding metal plates using dies with engravings of channels and the like. The thickness of the metal plates is set to, for example, about 0.1 to 1.0 mm.

Figure 4:
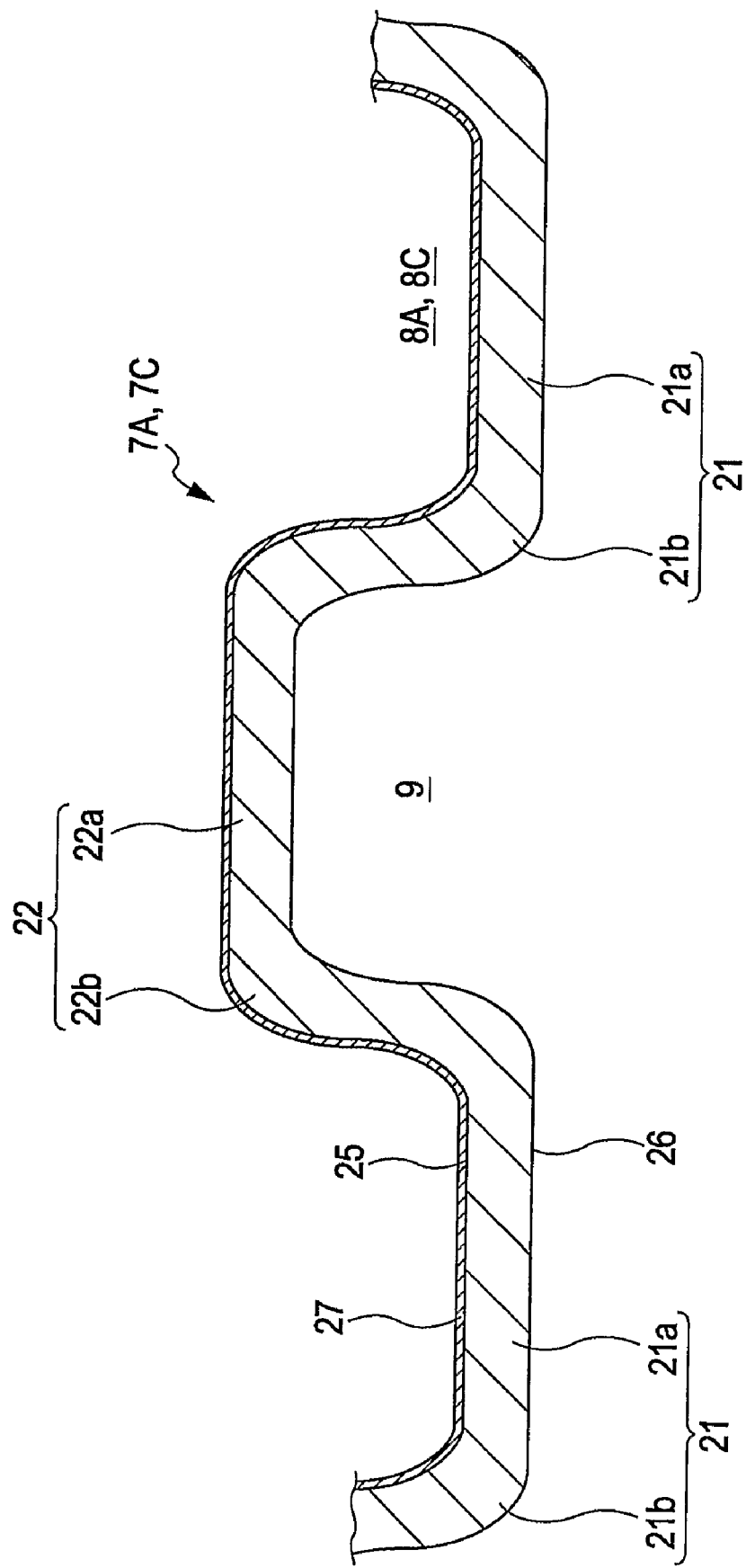
FIG. 4 is a cross-sectional view of a first or second separator.

FIG. 4 is a cross-sectional view of the first separator 7A or second separator 7C. The first separator 7A or second separator 7C is formed into a corrugated plate so that projections 21 that contact the gas diffusing layer 6A or 6C and projections 22 that contact the first separator 7A or the second separator 7C of the adjacent fuel cell 2 are alternately arranged. The gas channels 8A and 8C and the temperature-controlling medium channel 9 formed between the projections 21 and 22 are set to have a width of about 0.1 to 5.0 mm, for example.

The first separator 7A and the second separator 7C each have a reaction-side surface 25 facing the membrane electrode assembly 3, and a rear-side surface 26 at the opposite side. The reaction-side surfaces 25 define the gas channels 8A and 8C while the rear-side surfaces 26 define the temperature-controlling medium channels 9.

The first separator 7A and the second separator 7C composed of a stainless steel as the base material each have a corrosion-resistant coating layer 27 only on the reaction-side surface 25. No corrosion-resistant coating layer 27 is provided on the rear-side surface 26.

The corrosion-resistant coating layer 27 on the reaction-side surface 25 is composed of, for example, gold (Au). In particular, a gold plating layer having a thickness of about 5 μm is formed on the reaction-side surface 25 to obtain corrosion resistance in a strongly acidic environment particular to fuel cells, e.g., a sulfuric acid environment.

The corrosion-resistant coating layer 27 on the reaction-side surface 25 is not limited to a gold plating layer. The corrosion-resistant coating layer 27 may be a coating containing platinum (Pt), palladium (Pd), or titanium (Ti) or may be formed by surface modification to improve the corrosion resistance.

Instead of the corrosion-resistant coating layer, an oxide coating is formed on the rear-side surface 26 of each of the first separator 7A and second separator 7C. The rear-side surfaces 26 of the first separator 7A and the second separator 7C of the adjacent fuel cells 2 are welded together through welding parts 10. The welding parts 10 are formed in the reaction regions between the electrode catalyst layers 5A and 5C.

The oxide coating formed in the surface layer of the rear-side surface 26 has an insulating property. The rear-side surfaces 26 of the first separator 7A and the second separator 7C of the adjacent fuel cells 2 are welded to each other through the welding parts 10. Since contact electrical resistance between the first separator 7A and the second separator 7C is not generated at the welding parts 10, the penetration resistance of the first separator 7A and the second separator 7C can be reduced and the power-generating performance of the fuel cells can be enhanced.

The projections 21 and 22 formed by press-molding a metal plate respectively have rib flat portions 21a and 22a which are flat, and rib corner portions 21b and 22b which are at ends of the rib flat portions 21a and 22a and curved into an arch shape.

The welding parts 10 weld the rib flat portions 21a, which form groove bottoms that define the gas channels 8A and 8C, to each other.

The rear-side surfaces 26 of the first separator 7A and second separator 7C of the fuel cells 2 disposed at the two ends of the fuel cell stack 1 are each welded to the current collector 14 through welding parts 11. Since contact electrical resistance between the current collector 14 and the first separator 7A and between the current collector 14 and the second separator 7C is not generated at the welding parts 11, the penetration electrical resistance between the current collector 14 and the first separator 7A and between the current collector 14 and the second separator 7C can be reduced and the power-generating performance of the fuel cell stack 1 can be increased. Furthermore, the thermal resistance between the first separator 7A and the current collector 14 and between the second separator 7C and the current collector 14 can be reduced, and the end separators (first and second separators 7A and 7C) can be efficiently heated with the heaters 17.

Figure 5:
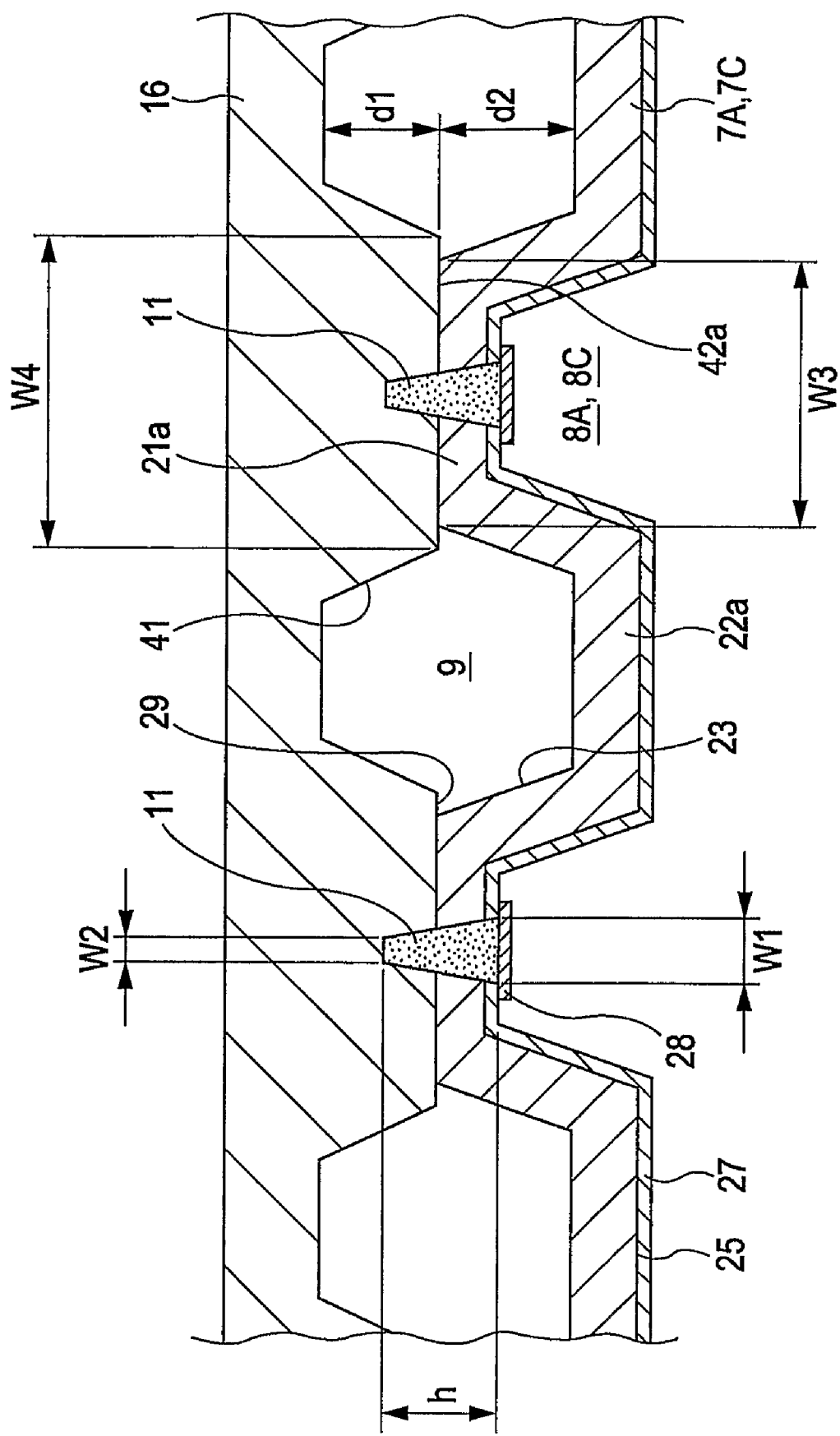
FIG. 5 is a cross-sectional view of a current collector and a first or second separator.

As shown in FIG. 5, the welding parts 11 weld the rib flat portions 21a, which are groove bottoms for defining the gas channels 8A and 8C, to the current collector 14.

A plurality of grooves 41 that define the temperature-controlling medium channel 9 are formed in an opposing surface 29 of the current collector 14 facing the first separator 7A or the second separator 7C. The temperature-controlling medium channels 9 are formed between the grooves 23 of the first separator 7A and the second separator 7C and the grooves 41 of the current collectors 14.

The opening width of each groove 41 of the current collector 14 is set to be smaller than the opening width of each groove 23 of the first separator 7A and the second separator 7C. In this manner, the width w4 of a rib flat portion 42a between the adjacent grooves 41 of the current collector 14 becomes larger than the width w3 of the rib flat portion 21a between the adjacent grooves 23 of the first separator 7A or the second separator 7C.

The ratio of the depth d2 of each groove 23 of the first separator 7A and the second separator 7C to the depth d1 of each groove 41 of the current collector 14 may be set to 4:1 to 1:2. For example, d1 is set to 0.3 mm and d2 is set to 0.4 mm. In this manner, the flow of the temperature-controlling medium flowing between the separator 7A or 7C and the current collector 14 can be controlled, and the temperature of the fuel cell stack 1 can be maintained at an appropriate temperature.

Each heater 17 is placed in a respective recess 45 in the end plate 16. An end surface of the heater 17 is in contact with the insulating plate 15. A joint sealer serving as a heat conducting material is filled in the space around the heater 17, the recess 45, and the current collector 14 to decrease the thermal contact resistance near the heater 17.

Each heater 17 includes a plurality of heater segments. Each segment of the heater 17 is arranged to overlap the welding part 11 in the stacking direction of the fuel cells 2, and faces the welding part 11 with the insulating plate 15 and the current collector 14 therebetween.

Examples of the process for joining the first separator 7A to the second separator 7C or joining the first separator 7A and the second separator 7C to the current collectors 14 include various welding processes such as arc welding, laser welding, TIG welding, MAG welding, MIG welding, plasma welding, and electron beam welding. Brazing may also be employed to weld the first separator 7A and the second separator 7C to the current collectors 14.

The first separator 7A and the second separator 7C are each heated from the reaction-side-surface 25 to weld the first separator 7A and the second separator 7C to the current collectors 14 through the welding parts 11. The width w2 of the tip of the welding part 11 in contact with the current collector 14 is smaller than the width w1 of the base end of the welding part 11 in contact with the separator 7A or 7C. By setting the weld depth h of the welding part 11, the electrical resistance and the thermal resistance between the current collectors 14 and the first and second separators 7A and 7C can be reduced.

After welding the first separator 7A and the second separator 7C to the current collectors 14, the welding parts 11 and the vicinities thereof are heat-treated to form passive films 28 in the surfaces. For example, the heat treatment is conducted by placing the first separator 7A, the second separator 7C, and the current collectors 14 after welding in a furnace and heating them at 80° C. to 200° C. Alternatively, a method of applying laser beams and other heating methods may be employed as the heating method.

The passive films 28 may be formed by any other appropriate heating method.

Figure 6A:
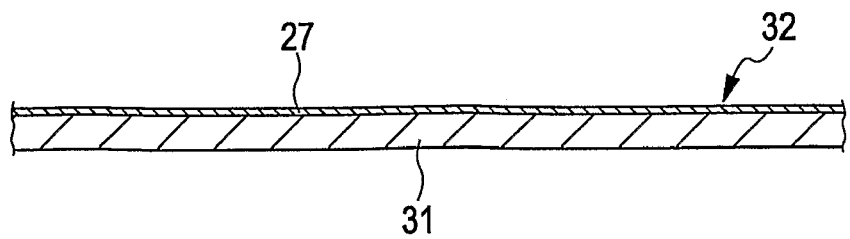
FIGS. 6A to 6C are diagrams showing the process of making the current collector and the first or second separator.
Figure 6B:
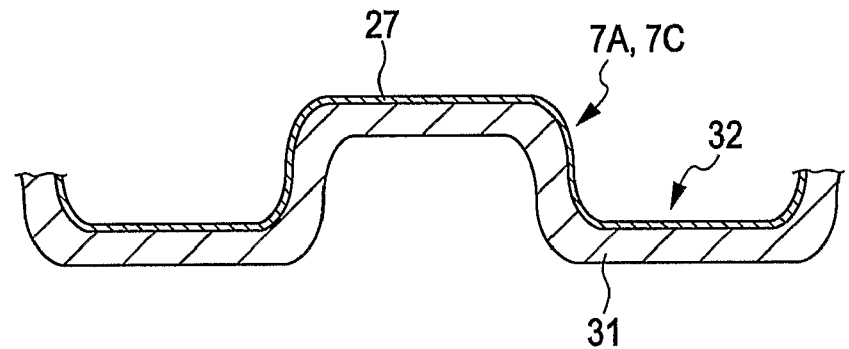
Figure 6C:
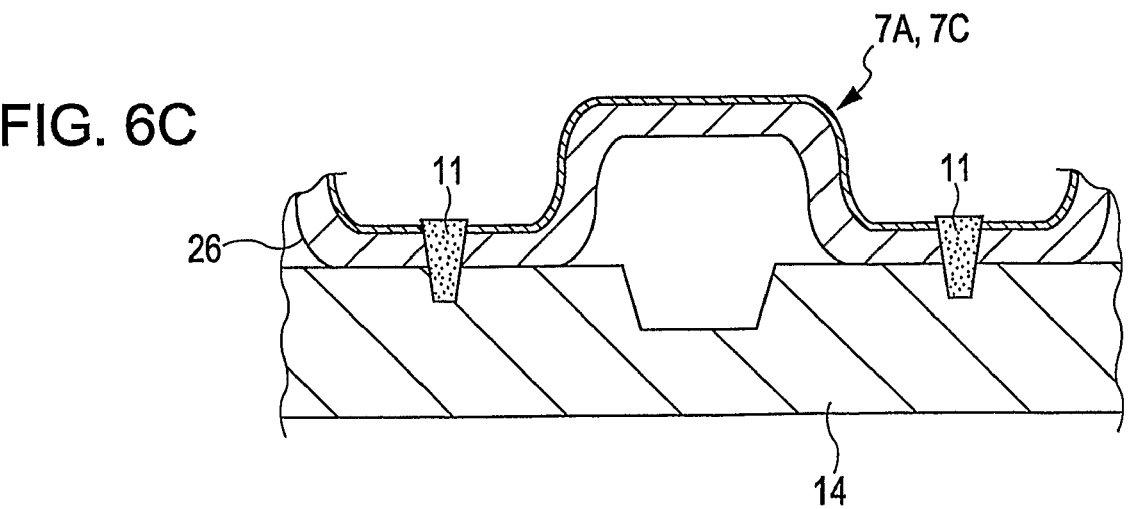

FIGS. 6A, 6B, and 6C show production steps of the fuel cell stack 1. Referring to FIG. 6A, a metal plate 32 including a base material 31 and a corrosion-resistant coating layer 27 is first prepared. The metal plate 32 is press-molded to form the first separator 7A or the second separator 7C, as shown in FIG. 6B. As shown in FIG. 6C, the rear-side surface 26 of the first separator 7A or the second separator 7C is welded to the current collector 14 through the welding parts 11. An assembly in which the first separator 7A and the second separator 7C are integrated with the current collector 14 is thereby formed. The production method of the fuel cell stack 1 is not limited as such. For example, alternatively, the base material 31 may be press-molded and then the corrosion-resistant coating layer 27 may be formed on the base material 31.

The effects and advantages of such a structure will now be described.

The reaction-side surfaces 25 of the first separator 7A and the second separator 7C facing the membrane electrode assembly 3 are required to have resistance against corrosion in a high-temperature, high-humidity acidic environment. When the corrosion-resistant coating layer 27, which does not easily undergo oxidation degradation, is formed on the reaction-side surface 25, the stainless steel that forms the base of each of the separators 7A and 7C is protected and sufficient corrosion resistance can be exhibited. Since the electrical conductivity of the reaction-side surface 25 is maintained by the corrosion-resistant coating layer 27, the contact electrical resistance between the first separator 7A and the membrane electrode assembly 3, and between the second separator 7C and the membrane electrode assembly 3, can be maintained at a low level.

The corrosion resistance of the welding parts 11 is degraded by the texture change and residual stresses caused by the heat of welding. This impairs the corrosion-resistant coating layer 27 of the welding parts 11 and the vicinities thereof at the reaction-side surface 25 of the cathode-side second separator 7C. However, by heat-treating the welding parts 11 and the vicinities thereof, the passive films 28 are formed in the surfaces and the degradation in corrosion resistance caused by texture change and residual stresses resulting from welding can be reduced.

The corrosion resistance required for the rear-side surfaces 26 of the first separator 7A and the second separator 7C, that form the temperature-controlling medium channels 9, is lower than that required for the reaction-side surfaces 25. Accordingly, no corrosion-resistant coating layer is formed on the rear-side surface 26. Whereas corrosion-resistant coating layers have been formed on both surfaces 25 and 26 of the first separator 7A and the second separator 7C according to existing structures, the step of forming the corrosion-resistant coating layer 27 on the rear-side surfaces 26 is not needed in accordance with the invention. Thus, the amount of noble metal used to form the corrosion-resistant coating layer 27 can be reduced, and the fuel cell cost can be reduced.

Although no corrosion-resistant coating layer is formed on the rear-side surface 26, the rear-side surface 26 is exposed to the cooling water (temperature-controlling medium) flowing in the temperature-controlling medium channel 9 during operation of the fuel cell, and eventually passivated by exposure to the cooling water to thereby form an oxide coating in the surface layer. Thus, the corrosion resistance can be enhanced.

The oxide coating formed in the surface layer of the rear-side surface 26 is an insulating coating. Since the rear-side surfaces 26 of the first separator 7A and the second separator 7C are welded to the current collectors 14 through the welding parts 11, the electrical resistance between the first and second separators 7A and 7C and the current collectors 14 can be reduced, and power-generating performance of the fuel cell stack 1 can be increased.

By forming the grooves 41 for defining the temperature-controlling medium channel 9 in the current collector 14, the degree of freedom of setting the cross-sectional area of the temperature-controlling medium channel 9 can be increased.

The width W4 of each rib flat portion 42a formed between adjacent grooves 41 of the current collector 14 is made larger than the width w3 of each rib flat portion 21a of the first separator 7A and the second separator 7C. In this manner, when the rib flat portion 21a is slightly misplaced relative to the rib flat portion 42a of the current collector 14 during welding, the rib flat portion 21a can still face the rib flat portion 42a and the rib flat portion 21a can be securely welded to the rib flat portion 42a.

If a sufficient flow of the temperature-controlling medium can be ensured without the grooves 41 in the current collector 14, then it is possible to form each current collector 14 to have a flat portion facing the separators 7A or 7C.

In starting the fuel cell below the freezing point while water remaining in each fuel cell 2 is frozen, the porous portions of gas-diffusing layers 6A and 6C clog due to the ice, and gas diffusion is inhibited. Thus, the output corresponding to the amount of reaction gas supplied cannot be obtained. Although each fuel cell 2 is heated by self-heating, the two fuel cells 2 at the two ends of the fuel cell stack 1 are heated less rapidly than the fuel cells 2 in the middle since the end plates 16 or the like having a large heat capacity draw the heat generated by the two fuel cells 2 at the ends.

Thus, in starting the fuel cells below the freezing point, the heaters 17 are turned on while the fuel cell stack 1 is operated to generate electricity so that the temperature of the fuel cell stack 1 can be rapidly elevated.

The heat generated by the heaters 17 is transmitted to the ends of the fuel cell stack 1 via the current collectors 14. Since the first separator 7A and the second separator 7C are respectively welded to the current collectors 14 through the welding parts 11, the thermal resistance therebetween can be reduced, and the heat generated by the heaters 17 is efficiently transmitted to the end separators (first separator 7A and second separator 7C).

Thus, the amount of time taken to increase the temperature of the entire fuel cell stack 1 to a temperature more than or equal to the freezing point can be decreased.

Since the rib flat portions 21a, which form the groove bottoms that define the gas channels 8A and 8C, of the first and second separators 7A and 7C are welded to the current collectors 14, the thermal resistance relative to the current collector 14 is reduced. The temperature of the gas diffusing layer 6A and gas diffusing layer 6C at the two ends of the fuel cell stack 1 can be efficiently elevated by the heat generated by the heaters 17. Moreover, since the welding parts 11 are formed at less-corrosive positions remote from the membrane electrode assembly 3, the decrease in resistance can be minimized even when the corrosion-resistant coating layer 27 is impaired by the welding parts 11.

By arranging the heater 17 to overlap the welding parts 11 in the stacking direction of the fuel cells 2, the heat conduction path from the heater 17 to each of the first and second separators 7A and 7C at the two ends of the fuel cell stack 1 can be shortened, and the temperature of the fuel cells 2 can be efficiently elevated.

Since the first separator 7A and the second separator 7C are respectively integrated with the current collectors 14 through the welding parts 11, displacement can be prevented. Moreover, the number components in the fuel cell stack 1 can be reduced, and ease of assembly can be enhanced.

EXAMPLE 1

Example 1 is shown in FIG. 7. In Example 1, the first separator 7A and the second separator 7C each have line-shaped welding parts 35 and dot-shaped welding parts 36 appropriately disposed according to the size of the projections 21 and 22, warpage shapes after pressing, and the like.

When the gas channel 8A and the gas channel 8C, respectively defined by the first separator 7A and the second separator 7C, and the temperature-controlling medium channel 9 extend in straight lines, the projections 21 are in close contact with the current collector 14. When these channels have serpentine shapes, it is possible that a gap will be generated between the projection 21 and the current collector 14. The line-shaped welding parts 35 and the dot-shaped welt spots 36 are appropriately combined and disposed according to the state of distribution of the contact portions of the first separator 7A and the second separator 7C.

The ratio of the area of welding (welded area) of the welding parts 11 relative to the contact area between the current collector 14 and the first separator 7A and between the current collector 14 and the second separator 7C is referred to as "welded area ratio" (junction area ratio). The welded area ratio may be set to 5% or more.

Since the welding parts 11 weld all parts of the rib flat portions 21a, crevice corrosion between the rib flat portions 21a can be prevented.

Figure 8:
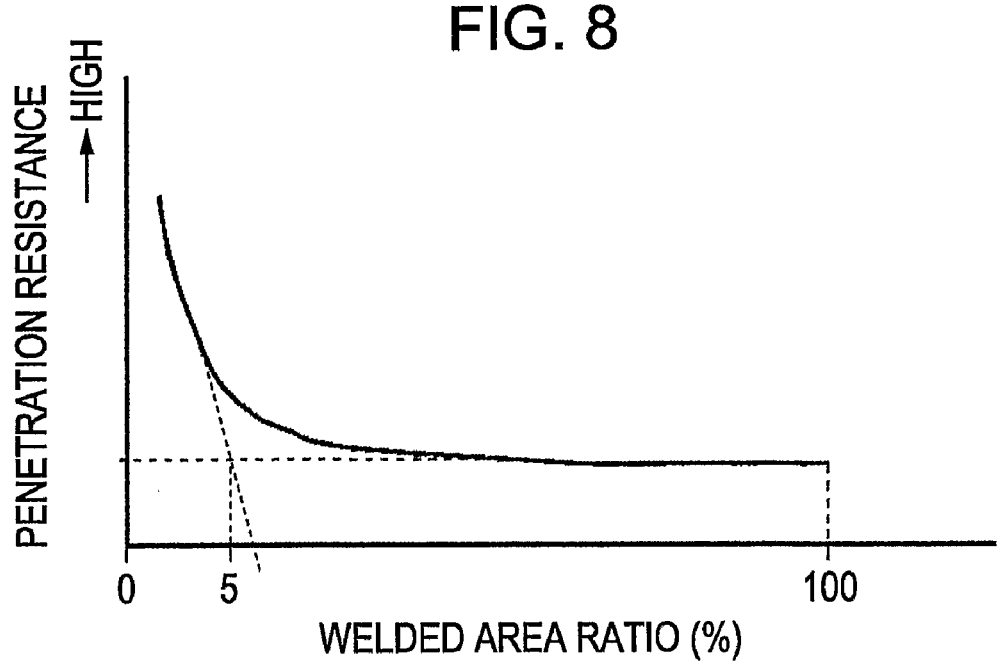
FIG. 8 is a characteristic diagram showing the relationship between the penetration electrical resistance between the first or second separator and the current collector, and the welded area ratio.

FIG. 8 is a graph showing the results of an experiment in which the penetration electrical resistance of the first separator 7A, the second separator 7C, and the current collectors 14 is measured while varying the welded area ratio and applying a predetermined load on the first separator 7A, the second separator 7C, and the current collectors 14. The graph of FIG. 8 shows that the contact electrical resistance of the first separator 7A, the second separator 7C, and the current collectors 14 is high when the welded area ratio is 0% (no welding), rapidly decreases up to a welded area ratio of 5%, and gently decreases at a welded area ratio of over 5% to 100%. In other words, the point of change of this characteristic is at a welded area ratio of 5%. Thus, by setting the welded area ratio to 5%, the penetration electrical resistance of the first separator 7A, the second separator 7C, and the current collectors 14 can be sufficiently decreased while the number of welding steps is decreased to increase the productivity.

Figure 9:
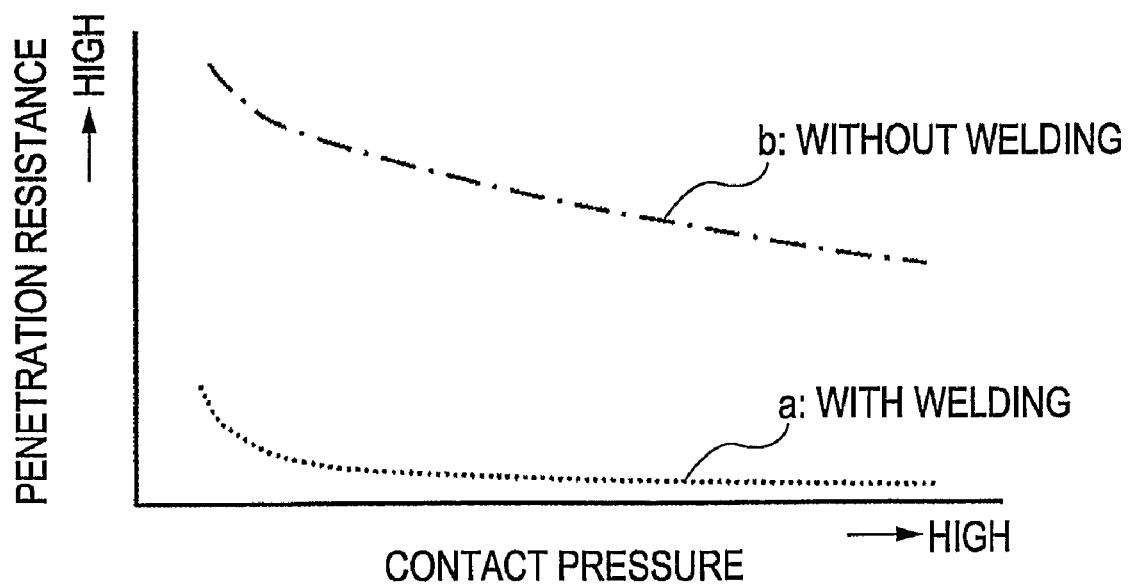
FIG. 9 is a characteristic diagram showing the relationship between the penetration electrical resistance between the first or second separator and the current collector, and the contact pressure.

FIG. 9 is a graph showing the results of an experiment in which the penetration electrical resistance of the first separator 7A, the second separator 7C, and the current collectors 14 is measured while varying the contact pressure on the first separator 7A and the second separator 7C. In FIG. 9, the characteristic "a" is when the first separator 7A and the second separator 7C are welded to the current collectors 14 at a welded area ratio of 50%, and the characteristic "b" is when the first separator 7A and the second separator 7C are not welded to the current collectors 14. The graph of FIG. 9 shows that when the first separator 7A and the second separator 7C are welded to the current collectors 14, the resistance can be significantly reduced when compared with when no welding is conducted. The graph also shows that the change in resistance against the contact pressure is smaller when welding is performed.

EXAMPLE 2

In Example 2, the welding parts 11 for the first and second separators 7A and 7C and the current collectors 14 are distributed such that the density of the welding parts 11 is high in positions where the current density is relatively high between the current collector 14 and each of the first separator 7A and the second separator 7C.

Figure 10:
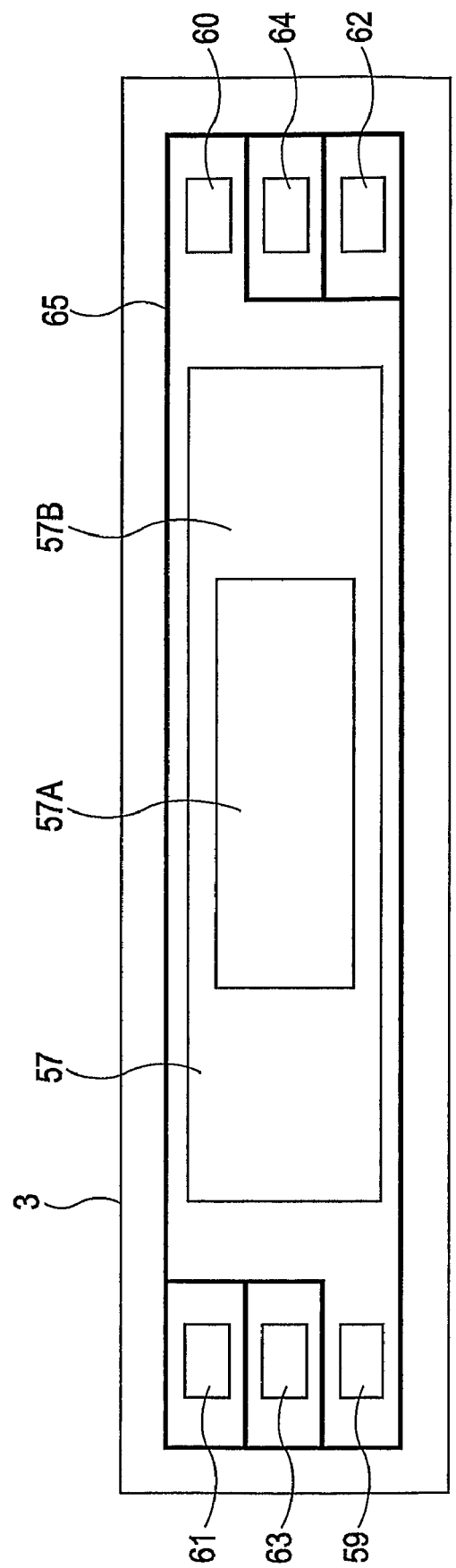
FIG. 10 is a structural diagram of a membrane electrode assembly.

FIG. 10 is a schematic structural diagram of the membrane electrode assembly 3. Referring to FIG. 10, the membrane electrode assembly 3 includes an inlet manifold 59 for the gas channel 8A, an outlet manifold 60 for the gas channel 8A, an inlet manifold 61 for the gas channel 8C, an outlet manifold 62 for the gas channel 8C, an inlet manifold 63 for the temperature-controlling medium channel 9, an outlet manifold 64 for the temperature-controlling medium channel 9, and a gasket 65.

The current density in a central part 57A in a reaction surface 57 of the membrane electrode assembly 3 is higher than that in a peripheral part 57B. Thus, in this example, the distribution density of the welding parts 11 of the first separator 7A, the second separator 7C, and the current collectors 14 is adjusted to be higher in the area opposing the central part 57A than in the area opposing the peripheral part 57B.

In this manner, the electrical conductivity between the first separator 7A, the second separator 7C, and the current collectors 14 can be increased according to the distribution state of the current density in the reaction surface 57, and the electromotive force of the fuel cell stack 1 can be efficiently derived.

EXAMPLE 3

Figure 11:
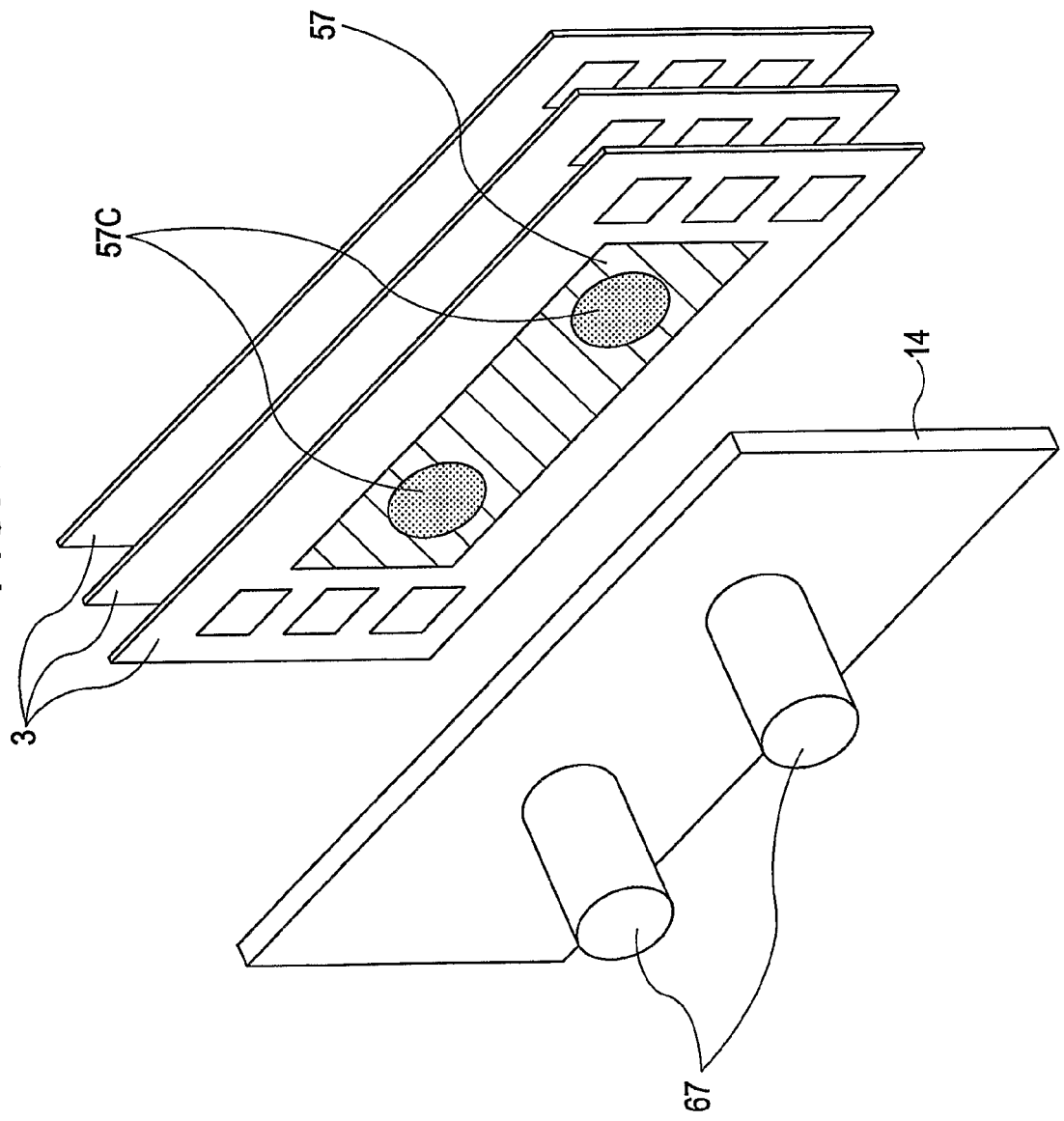
FIG. 11 is an oblique perspective view of the current collector and the membrane electrode assembly.

Example 3 is shown in FIG. 11. As shown in FIG. 11, the current collector 14 of this example has bossed parts 67 for retrieving electric power. The distribution density of the welding parts 11 for welding the current collectors 14 to the first separator 7A and the second separator 7C is controlled to be higher in regions 57C of the reaction surface 57 opposing the bossed parts 67 than in other regions.

The bossed parts 67 project from the surface of the current collector 14 and penetrate the end plate 16 so that the electromotive force of the fuel cell stack 1 can be derived from the bossed parts 67.

In this manner, by increasing the electrical conductivity between the current collector 14 and each of the first separator 7A and the second separator 7C so as to correspond to the state in which the current density distribution of the reaction surface 57 of the membrane electrode assembly 3 is high in the regions 57C opposing the bossed parts 67, the electromotive force of the fuel cell stack 1 can be efficiently derived.

EXAMPLE 4

In Example 4, the rear-side surface 26 of each of the first separator 7A and the second separator 7C and the opposing surface 29 of each current collector 14 are washed with an acidic solution to thereby remove the oxide coating in the surface layer, and the first separator 7A and the second separator 7C are then welded to the current collectors 14.

By performing the welding after removing the oxide coatings on the rear-side surfaces 26 of the first separator 7A and the second separator 7C and the opposing surface 29 of each current collector 14, the contact electrical resistance between the current collector 14 and each of the first separator 7A and the second separator 7C can be reduced, and the electromotive power of the fuel cell stack 1 can be efficiently derived.

EXAMPLE 5

In Example 5, the oxide coatings in the rear-side surfaces 26 of the first separator 7A and the second separator 7C and the oxide coatings in the opposing surface 29 of each current collector 14 are removed, and then the current collectors 14 are welded to the first separator 7A and the second separator 7C.

In this example, the oxide coatings are removed by immersing the base materials of the first separator 7A, the second separator 7C, and the current collectors 14 in an acidic solution and applying a predetermined potential to the base materials.

In this manner also, by performing the welding after removing the oxide coatings on the rear-side surfaces 26 of the first separator 7A and the second separator 7C and the opposing surface 29 of each current collector 14, the contact resistance between the current collector 14 and the first separator 7A and between the current collector 14 and the second separator 7C can be reduced, and the electromotive power of the fuel cell stack 1 can be efficiently derived.

EXAMPLE 6

In Example 6, the oxide films on the rear-side surfaces 26 of the first separator 7A and the second separator 7C and the opposing surface 29 of each current collector 14 are removed by mechanical milling, and the first separator 7A and the second separator 7C are then welded to the current collectors 14.

The surface roughness of the rear-side surfaces 26 of the first separator 7A and the second separator 7C is controlled to a predetermined surface roughness X-2 (see FIG. 12) in a portion surrounded by the temperature-controlling medium channel 9 to increase the electrical and thermal conductivity. Meanwhile, the surface roughness is controlled to a value smaller than X-2 in a portion that faces the gasket to increase the sealing ability.

Figure 12:
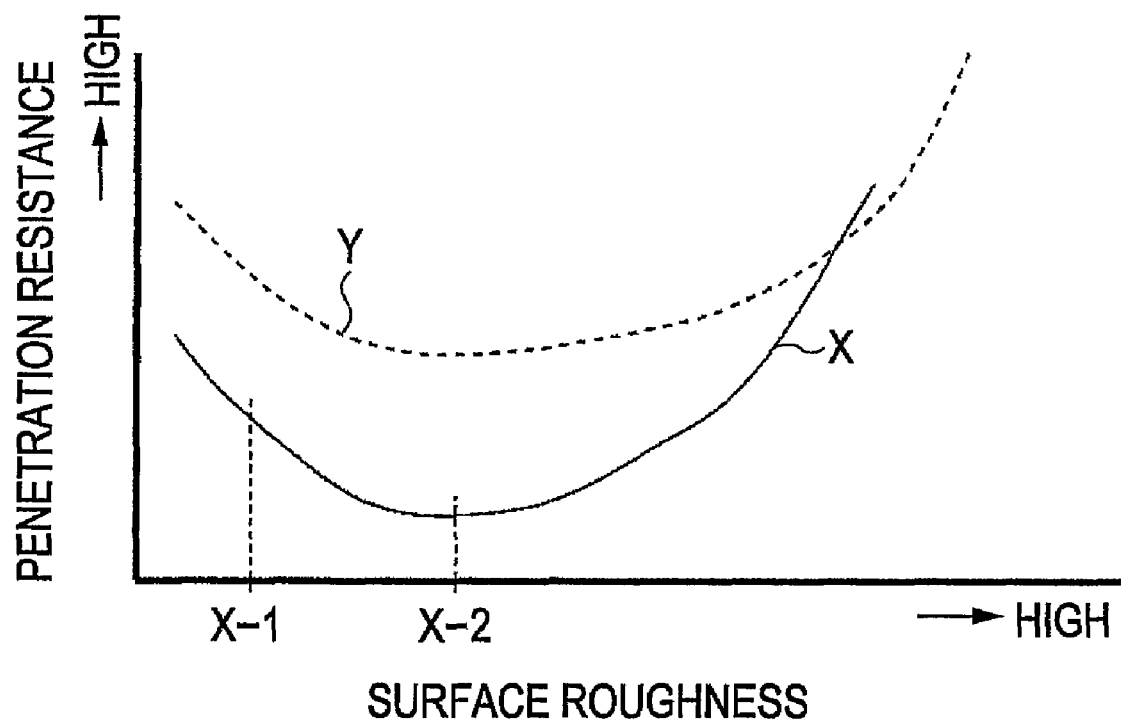
FIG. 12 is a characteristic diagram showing the relationship between the penetration electrical resistance of the first or second separator and the surface roughness of a rear-side surface.

FIG. 12 shows the results of the experiment in which the penetration electrical resistance of the first separator 7A, the second separator 7C, and the current collectors 14 is measured by varying the surface roughness of the rear-side surfaces 26 of the first separator 7A and second separator 7C which are composed of two metals, X and Y. Although there is an absolute difference in resistance value derived by the difference in materials, X and Y, both metals have sensitivity of resistance value against the surface roughness. With metal X, the resistance value is minimum at the surface roughness X-2.

By adequately increasing the surface roughness of the rear-side surfaces 26 of the first separator 7A and the second separator 7C and the opposing surfaces 29 of the current collectors 14, the contact electrical resistance between the current collectors 14 and the first separator 7A and between the current collector 14 and the second separator 7C can be effectively reduced. The contact thermal resistance between the current collectors 14 and the first separator 7A and the second separator 7C can also be reduced and the temperature of the end separators (first separator 7A and second separator 7C) can be efficiently increased by the heat generated from the heaters 17.

The surface roughness Ra of the first separator 7A and the second separator 7C may be set to about 1.5 in surfaces that contact the current collectors 14 so that the roughness is higher than that of other portions.

EXAMPLE 7

In Example 7, the first separator 7A and the second separator 7C are welded to the current collectors 14 while a predetermined load is applied to compress the first separator 7A, the second separator 7C, and the current collectors 14.

The welding parts 11 are arranged such that the penetration electrical resistance of the first separator 7A, the second separator 7C, and the current collectors 14 does not exceed a predetermined value (e.g., 200 m$\Omega$m$^2$) at an arbitrary position in the reaction area that is remote from the welding part 11. In this manner, the penetration electrical resistance of the first separator 7A, the second separator 7C, and the current collectors 14 can be effectively decreased. The contact thermal resistance between the current collectors 14 and the first separator 7A and the second separator 7C can also be reduced, and the temperature of the end separators (first separator 7A and second separator 7C) can be efficiently increased by the heat generated from the heaters 17.

EXAMPLE 8

Figure 13:
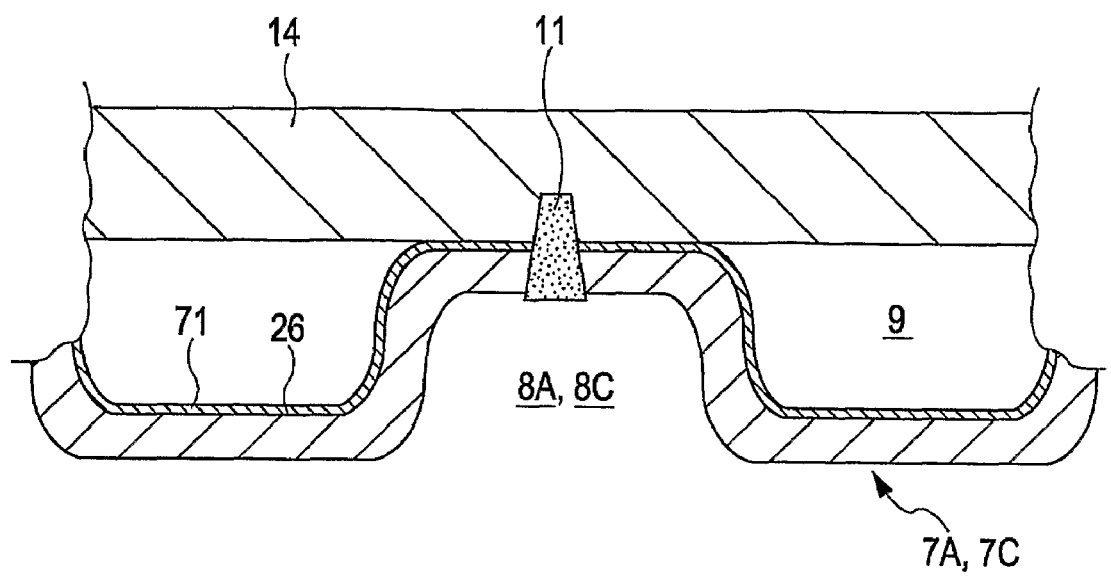
FIG. 13 is a cross-sectional view of the current collector and the first or second separator.

Example 8 is shown in FIG. 13. In Example 13, corrosion-resistant coating layers 71 are formed on the rear-side surfaces 26 of the first separator 7A and the second separator 7C facing the current collectors 14.

In this manner, the corrosion resistance of the first separator 7A and the second separator 7C can be enhanced by the corrosion-resistant coating layers 71. Moreover, when the corrosion-resistant coating layers 71 are formed by plating a material with high electrical conductivity, such as gold, the contact electrical resistance between the first separator 7A and the current collector 14 and between the second separator 7C and the current collector 14 can be effectively reduced.

EXAMPLE 9

Figure 14:
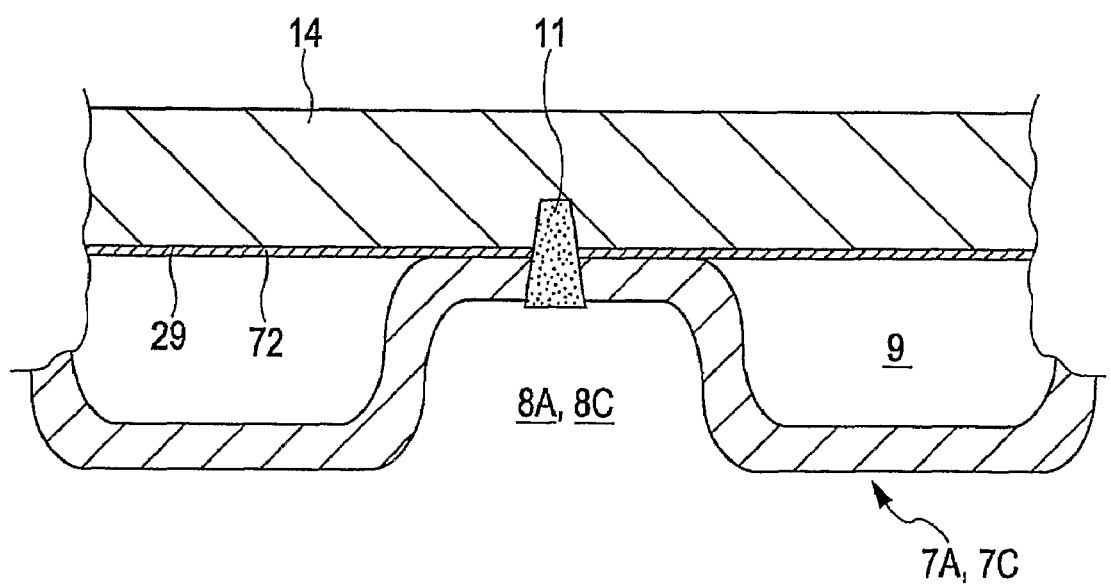
FIG. 14 is a cross-sectional view of the current collector and the first or second separator.

Example 9 is shown in FIG. 14. In Example 9, corrosion-resistant coating layers 72 are formed on the opposing surfaces 29 of the current collectors 14 that oppose the first separator 7A and the second separator 7C.

In this manner, the corrosion resistance of the current collectors 14 can be increased. Moreover, when the corrosion-resistant coating layers 72 are formed by plating a material with high electrical conductivity, such as gold, the contact electrical resistance between the first separator 7A and the second separator 7C and the current collectors 14 can be effectively reduced.

EXAMPLE 10

In Example 10, a laser beam is applied to the reaction-side surface 25 of the first separator 7A and the second separator 7C in a normal temperature atmosphere to form the welding parts 11, and then a laser beam is applied to the surfaces and vicinities of the welding parts 11 to heat the irradiated portions at 80° C. to 200° C. and form the passive films 28 in the portions irradiated with the laser beam to thereby impart corrosion resistance (anti-corrosion treatment).

As the anti-corrosion treatment, the laser beam is applied by continuously decreasing the output after the welding so as to form the passive films 28 in the portions irradiated with the laser beam. When the laser beam is applied while changing the output, welding and formation of the passive films 28 are continuously carried out, and the number of process steps can be reduced. Moreover, since the portions irradiated with the laser beam are limited to the welding parts 11 and the vicinities thereof, the effect of heat on the first separator 7A and the second separator 7C can be suppressed.

Alternatively, a laser may be applied after welding while continuously expanding the focus range to form the passive films 28 in the irradiated portions. In this manner, by applying the laser beam while changing the focus range, welding and heat treatment for forming the passive films 28 can be conducted continuously, and the number of process steps can be reduced. Furthermore, since the laser beam irradiation range is limited to the welding parts 11 and the vicinities thereof, the effect of heat on the first separator 7A and the second separator 7C can be suppressed.

EXAMPLE 11

Figure 15:
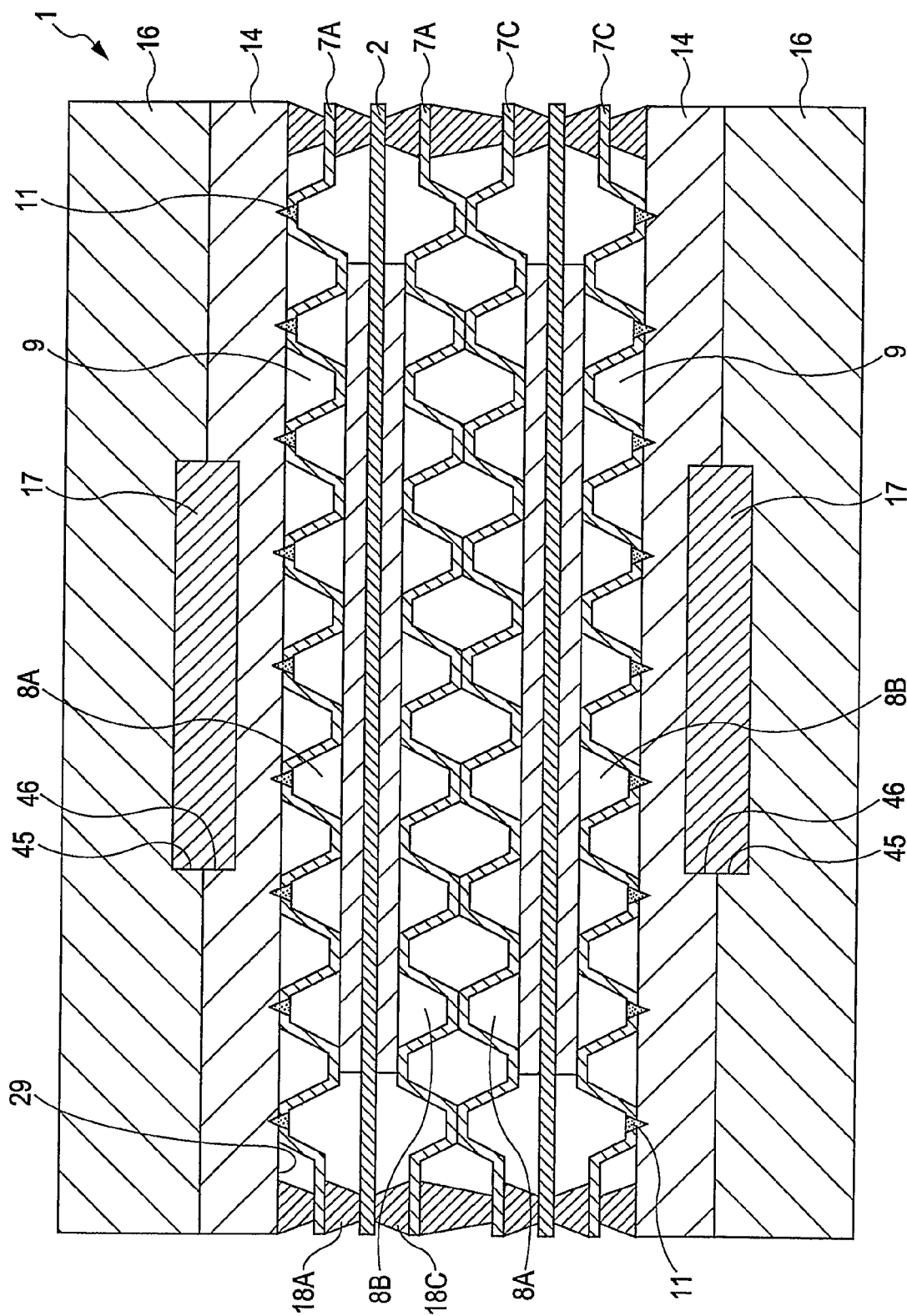
FIG. 15 is a cross-sectional view of the fuel cell stack.

Example 11 is shown in FIG. 15. In Example 11, one heater 17 is interposed between the current collector 14 and the end plate 16. The current collector 14 has a recess 46 for accommodating the heater 17, and the end plate 16 also has a recess 45 for accommodating the heater 17.

The heater 17 is arranged to face the central part 57A of the membrane electrode assembly 3 shown in FIG. 10. The temperature of the central part 57A is elevated by the heat generated by the heater 17.

EXAMPLE 12

Figure 16:
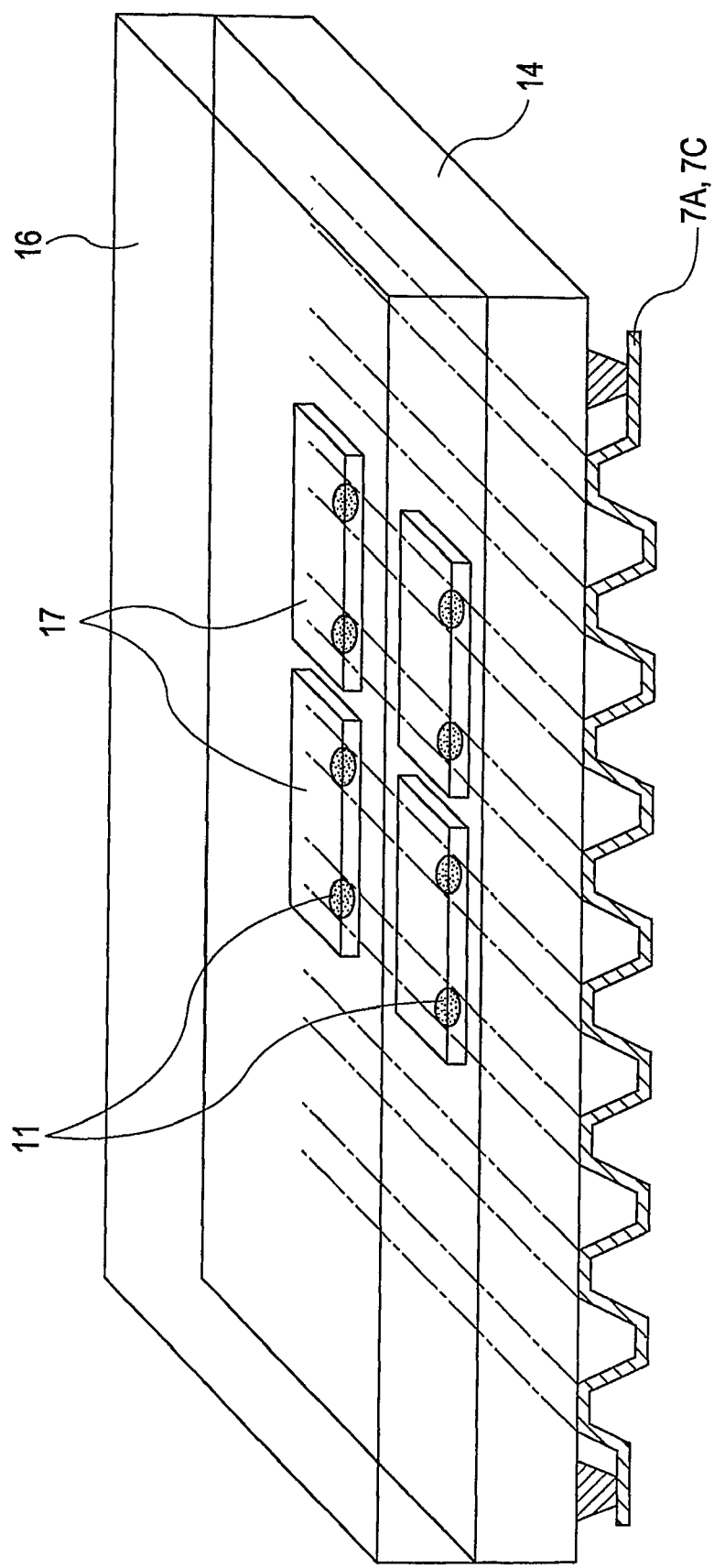
FIG. 16 is an oblique perspective view of the current collector and the first or second separator.

Example 12 is shown in FIG. 16. In Example 12, a plurality of heaters 17 are interposed between the current collector 14 and the end plate 16.

The heaters 17 are arranged to oppose the welding parts 11. Since the heaters 17 overlap the welding parts 11 in the stacking direction of the fuel cells 2, the heat conduction paths between the heaters 17 and the first separator 7A and the second separator 7C at the two ends of the fuel cell stack 1, respectively, can be shortened, and the fuel cells 2 can be efficiently heated.

The present embodiment has the following advantages.

(A) A fuel cell stack 1 includes a membrane electrode assembly 3 including an electrolyte membrane 4 and electrode catalyst layers 5A and 5C sandwiching the electrolyte membrane 3; metal separators 7A and 7C for defining gas channels 8A and 8C, the metal separators 7A and 7C being respectively disposed on both surfaces of the membrane electrode assembly 3; a current collector 14 from which electromotive force is derived, the current collector 14 being in contact with at least one of the metal separators 7A and 7C; and joining parts (welding parts 11) that join the metal separator 7A or 7C to the current collector 14 in portions where the metal separator 7A or 7C contacts the current collector 14. There is also provided a method for forming a fuel cell stack 1 including a membrane electrode assembly 3 that includes an electrolyte membrane 4 and electrode catalyst layers 5A and 5C sandwiching the electrolyte membrane 4 and metal separators 7A and 7C for defining gas channels 8A and 8C, the metal separators 7A and 7C being respectively disposed on both surfaces of the membrane electrode assembly 3, the method including the steps of bringing a current collector 14, from which electromotive force is derived, into contact with at least one of the metal separators 7A and 7C, and joining the metal separator and the current collector 7A and/or 7C in a portion where the metal separator 7A and/or 7C contacts the current collector 14. In this manner, the penetration electrical resistance between the current collector 14 and the metal separator 7A and/or 7C can be reduced, and power-generating performance of the fuel cell stack 1 can be enhanced.

(B) The fuel cell stack 1 further includes a heater 17 for heating the current collector 14 and the metal separator 7A and/or 7C is joined to the current collector 14. Thus, the electrical resistance between the metal separator 7A and/or 7C and the current collector 14 can be reduced and power-generating performance of the fuel cell stack 1 can be increased. Moreover, the thermal resistance between the metal separator 7A and/or 7C and the current collector 14 can be reduced, and the metal separators can be efficiently heated by the heater 17.

(C) The first separator 7A and the second separator 7C are welded to the current collectors 14, and the welded area ratio of the welding parts relative to the contact area between the first separator 7A and the second separator 7C and the current collectors 14 may be set to 5% or more. In this manner, the resistance of the separators 7A and 7C can be reduced, and the power-generating performance of the fuel cell stack 1 can be increased.

(D) The distribution of the welding parts 11 is adjusted to be high in portions with relatively high electrical current density between the first separator 7A and the second separator 7C and the current collectors 14 during power generation. In this manner, the electrical conductivity between the current collectors 14 and the first and second separators 7A and 7C can be increased according to the distribution status of the current density, and the electromotive force of the fuel cell stack 1 can be efficiently derived.

(E) The distribution density of the welding parts 11 between the first and second separators 7A and 7C and the current collectors 14 is adjusted to be higher in the region that opposes the central part 57A of the membrane electrode assembly 3, than in the region that opposes the peripheral part 57B. In this manner, the electrical conductivity between the first and second separators 7A and 7C and the current collectors 14 can be increased according to the distribution status of current density in the reaction surface 57 of the membrane electrode assembly 3, and the electromotive force of the fuel cell stack 1 can be more efficiently derived.

(F) The current collector 14 has the bossed parts 67. The distribution density of the welding parts 11 between the first and second separators 7A and 7C and the current collectors 14 is adjusted to be higher in the regions 57C opposing the bossed parts 67 than in other regions. In this manner, the electrical conductivity between the first and second separators 7A and 7C and the current collectors 14 can be increased according to the distribution status of the current density in the current collectors 14, and the electromotive force of the fuel cell stack 1 can be efficiently derived.

(G) The first and second separators 7A and 7C are heated so that they are welded to the current collectors 14. Thus, the first and second separators 7A and 7C can be securely welded to the current collectors 14.

(H) Each rib flat portion 21a which serves as a groove bottom for forming the gas channel 8A or 8C of the second separator 7A or 7C is welded to the current collector 14. Thus, the thermal resistance between the first and second separators 7A and 7C and the current collectors 14 can be reduced, and the gas diffusing layers 6A and 6C disposed at the two ends of the fuel cell stack 1 can be efficiently heated. Moreover, since the welding parts 11 are located in less-corrosive portions distant from the membrane electrode assembly 3, the decrease in corrosion resistance can be suppressed even when the corrosion-resistant coating layer 27 is impaired by the welding parts 11.

(I) The grooves 41 for forming the temperature-controlling medium channel 9 are formed in the current collector 14. In this manner, the degree of freedom of setting the cross-sectional area of the temperature-controlling medium channel 9 can be extended, and the temperature control of the fuel cells 2 at the two ends can be optimized.

(J) The width W4 of a rib flat portion 42a between the adjacent grooves 41 of the current collector 14 is adjusted to be larger than the width W3 of the rib flat portion 21a between the adjacent grooves 23 of the first separator 7A or the second separator 7C. In this manner, the rib flat portion 21a opposes the rib flat portion 42a even when the position of the rib flat portion 21a is slightly displaced relative to the rib flat portion 42a of the current collector 14 during welding, and welding can be securely conducted.

(K) The corrosion-resistant coating layer 27 is formed in the reaction-side surface 25 of the separator 7A or 7C opposing the membrane electrode assembly 3. In this manner, the corrosion resistance can be imparted to the first and second separators 7A and 7C by the corrosion-resistant coating layers 27 while the number of steps for forming the corrosion-resistant coating layer 27 in the rear-side surface 26 of each of the first and second separators 7A and 7C can be reduced to reduce the fuel cell cost. Since the first and second separators 7A and 7C are welded to the current collectors 14, the electrical resistance between the current collector 14 and the rear-side surface 26 not provided with the corrosion-resistant coating layer 27 can be reduced, and the power-generating performance of the fuel cell stack 1 can be increased.

(L) The temperature-controlling medium channel 9 is formed between the current collector 14 and the first separator 7A and between the current collector 14 and the second separator 7C. The corrosion-resistant coating layers 71 are formed in at least one of the rear-side surface 26 and the opposing surface 29 of each of the first and second separators 7A and 7C. In this manner, the corrosion-resistant coating layers 71 increases the corrosion resistance between the current collectors 14 and the first and second separators 7A and 7C, and the contact electrical resistance between the current collectors 14 and the first and second separators 7A and 7C can be reduced by the formation of the corrosion-resistant coating layers 71 having high conductivity.

(M) After the first and second separators 7A and 7C are welded to the current collectors 14 by heating, anti-corrosion treatment is effected at least on surfaces of the welding parts 11. Although the corrosion-resistant coating layers 27 are impaired by formation of the welding parts 11, by subjecting the surfaces of the welding parts 11 to anti-corrosion treatment, corrosion at the treated portions can be suppressed, and elution of metal ions by corrosion of the welding parts 11 can be prevented.

(N) The first and second separators 7A and 7C are welded to the current collectors 14 while applying a predetermined load. Thus, the electrical resistance between the current collectors 14 and the first and second separators 7A and 7C can be reduced, and power-generating performance of the fuel cell stack 1 can be increased. Moreover, the contact thermal resistance between the first and second separators 7A and 7C and the current collectors 14 can be reduced, and the end separators (first and second separators 7A and 7C) can be efficiently heated by the heat generated by the heater 17.

(O) The rear-side surface 26 of each of the first and second separators 7A and 7C is welded to the opposing surface 29 of the current collector 14 after an oxide coating is removed from at least one of these surfaces. In this manner, the contact electrical resistance between the current collectors 14 and the first and second separators 7A and 7C can be reduced.

(P) The rear-side surface 26 of each of the first and second separators 7A and 7C is welded to the opposing surface 29 of the current collector 14 after at least one of these surfaces is washed with an acidic solution to remove the oxide coating. Thus, the contact electrical resistance between the current collectors 14 and the first and second separators 7A and 7C can be reduced.

(Q) The rear-side surface 26 of each of the first and second separators 7A and 7C is welded to the opposing surface 29 of the current collector 14 after the oxide coating is removed from at least one of these surfaces by applying a predetermine potential in an acidic solution. Thus, the contact electrical resistance between the current collectors 14 and the first and second separators 7A and 7C can be reduced.

(R) The rear-side surface 26 of each of the first and second separators 7A and 7C is welded to the opposing surface 29 of the current collector 14 after the oxide coating is removed by milling from at least one of these surfaces. In this manner, the electrical resistance between the first and second separators 7A and 7C and the current collectors 14 can be decreased, and the power-generating performance of the fuel cell stack 1 can be enhanced. Moreover, the thermal resistance between the current collectors 14 and the first and second separators 7A and 7C can be reduced, and the end separators (first and second separators 7A and 7C) can be efficiently heated by the heat generated by the heater 17.

(S) The joining parts (welding parts 11) that join the first and second separators 7A and 7C to the current collectors 14 are arranged to overlap the electric heaters 17 in the stacking direction of the fuel cell 2. In this manner, the heat conduction path from the heaters 17 to the first and second separators 7A and 7C at the two ends of the fuel cell stack 1 can be shortened, and each fuel cell 2 can be efficiently heated.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell stack comprising:
cells in series, each of the cells including a membrane electrode assembly including an electrolyte membrane, electrode catalyst layers sandwiching the electrolyte membrane, and metal separators that define gas channels, the metal separators being respectively disposed at both surfaces of the membrane electrode assembly;

current collectors sandwiching the cells, the current collectors derive electromotive force from the cells, each of the current collectors being in contact with a corresponding one of the metal separators; and joining parts that join each corresponding metal separator and current collector at portions where the metal separator contacts the current collector;

wherein, each of the joining parts comprises a portion that forms a groove bottom of one of the gas channels being welded to the current collector.

2. The fuel cell stack according to claim 1, further comprising a heater for heating the current collector.

3. The fuel cell stack according to claim 1, wherein a ratio of the area occupied by the joining parts to the contact area between the metal separator and the current collector is 5% or more.

4. The fuel cell stack according to claim 1, wherein the joining parts are concentrated in areas with relatively high electric current density between the metal separator and the current collector during power generation from the fuel cell stack.

5. The fuel cell stack according to claim 4, wherein a distribution density of the joining parts in a region aligned with a center portion of a reaction surface of the membrane electrode assembly is higher than a distribution density of the joining parts in a region aligned with a peripheral portion of the reaction surface.

6. The fuel cell stack according to claim 4, wherein the current collector includes a bossed part from which electric power is derived, and a distribution density of the joining parts in a region aligned with the bossed part is higher than a distribution density of the joining parts in other regions.

7. The fuel cell stack according to claim 1, wherein a corrosion resistant coating layer is provided on a reaction-side surface of each metal separator that opposes the membrane electrode assembly.

8. The fuel cell stack according to claim 1, wherein a corrosion-resistant coating layer is formed on at least one of the joining part-side surface of the current collector and the joining part-side surface of the metal separator.

9. The fuel cell stack according to claim 1, wherein the joining parts comprise welding parts where the metal separator is welded to the current collector from the metal separator-side.

10. The fuel cell stack according to claim 9, wherein surfaces of the welding parts formed in the metal separator surface are subjected to anti-corrosion treatment.

11. A fuel cell stack comprising:
cells in series, each of the cells including a membrane electrode assembly including an electrolyte membrane, electrode catalyst layers sandwiching the electrolyte membrane, and metal separators that define gas channels, the metal separators being respectively disposed at both surfaces of the membrane electrode assembly;

current collectors sandwiching the cells, the current collectors derive electromotive force from the cells, each of the current collectors being in contact with a corresponding one of the metal separators; and joining parts that join each corresponding metal separator and current collector at portions where the metal separator contacts the current collector;

wherein a joining part-side surface of the current collector includes grooves and is thus corrugated or a joining part-side surface of the metal separator includes projections that form the gas channels and is thus corrugated, and a temperature-controlling medium channel is formed between the current collector and the metal separator.

12. The fuel cell stack according to claim 11, wherein the joining part-side surface of the current collector includes grooves and is thus corrugated, and the joining part-side surface of the metal separator includes projections that form the gas channels, wherein each joining part is formed between a projection of the current collector and the projection of the metal separator, and wherein a width of a flat portion at the top of the projection of the current collector is larger than a width of a flat portion at the top of the projection of the metal separator.

13. A fuel cell stack comprising:
cells in series, each of the cells including a membrane electrode assembly including an electrolyte membrane, electrode catalyst layers sandwiching the electrolyte membrane, and metal separators that define gas channels, the metal separators being respectively disposed at both surfaces of the membrane electrode assembly;

current collectors sandwiching the cells, the current collectors derive electromotive force from the cells, each of the current collectors being in contact with a corresponding one of the metal separators;

joining parts that join each corresponding metal separator and current collector at portions where the metal separator contacts the current collector; and a heater for heating the current collector;

wherein the joining parts are aligned with the heater in the stacking direction of the membrane electrode assembly and the metal separator.

* * * * *